UNITED STATES PATENT OFFICE.

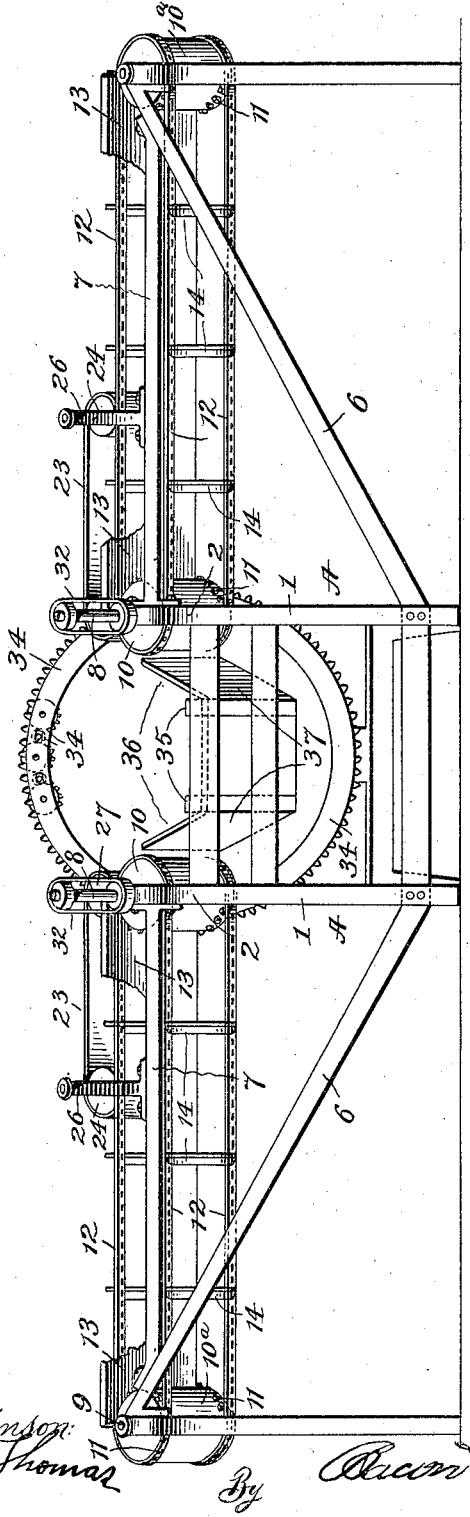

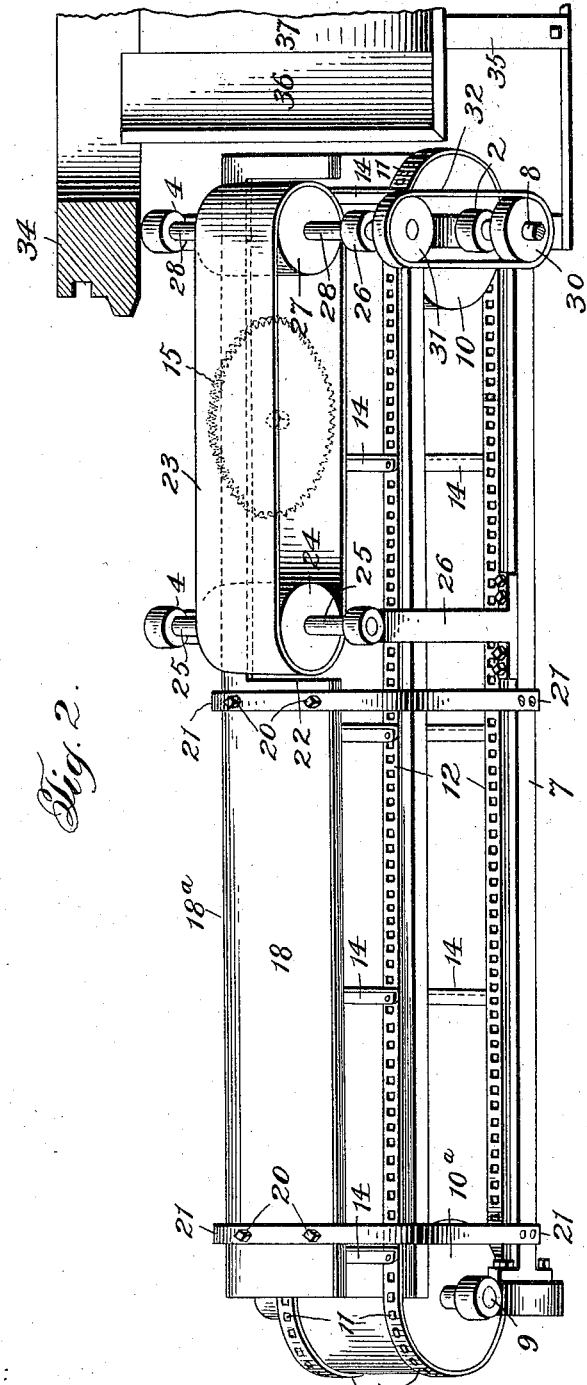

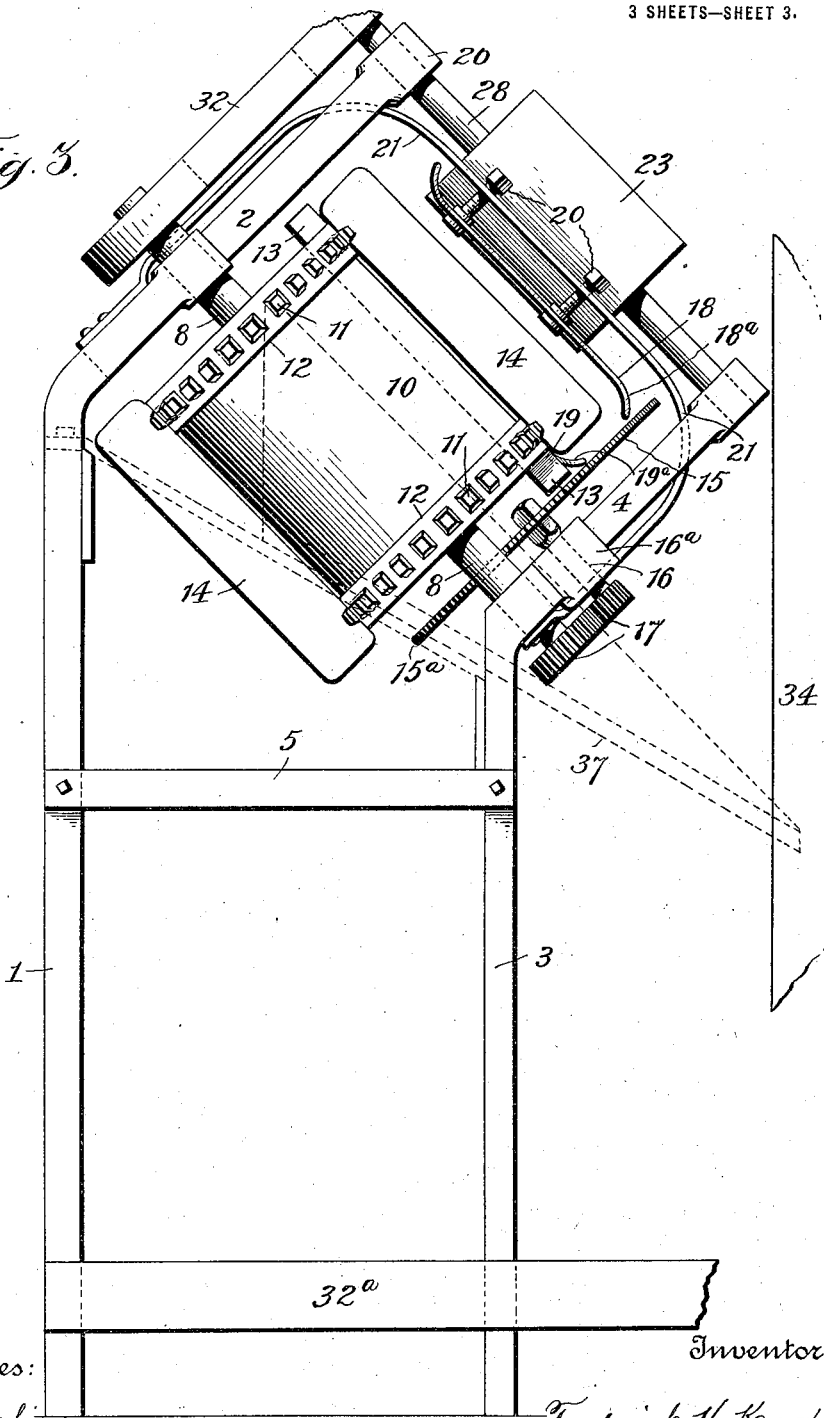

FREDERICK H. KNAPP, OF WESTMINSTER, MARYLAND, ASSIGNOR TO THE KNAPP HUSKER COMPANY, OF BALTIMORE, MARYLAND, A CORPORATION OF MARYLAND.

CORN FEEDING AND BUTTING MECHANISM.

1,179,437.  Specification of Letters Patent.  Patented Apr. 18, 1916.

Application filed December 30, 1912. Serial No. 739,339.

*To all whom it may concern:*

Be it known that I, FREDERICK H. KNAPP, citizen of the United States, residing at Westminster, in the county of Carroll and State of Maryland, have invented certain new and useful Improvements in Corn Feeding and Butting Mechanism, of which the following is a specification, reference being had therein to the accompanying drawing.

This invention relates to husking machines and has to deal more particularly with improved and efficient means for feeding the supply of corn to be husked and for butting the ears of the corn prior to the delivery of the latter to the husking mechanism.

While susceptible of a variety of adaptations the improved feeding mechanism is designed more especially for use in connection with a husking machine employing a circular series of husking rolls arranged in pairs, and is adapted to deliver the ears directly from the ear butting means, into husking position on the husking rolls.

Various machines have heretofore been devised for feeding the ears and properly positioning the same relative to the trimming or butting mechanism, but these constructions have been more or less complicated and expensive, and the butting operation was a compartively slow one, and it is one of the dominating characteristics of the present invention to provide an improved combination and arrangement of parts for the above purpose, by reducing the number of elements employed, decreasing the cost of production, increasing the general efficiency, and making possible the butting of the ears with greater despatch than heretofore.

More particularly the invention includes means for trimming off the butt end of ears preparatory to their delivery to the husking device, and novel means for feeding the ears to and past the butting device by a sidewise movement of the ears, and associated means acting automatically in the said movement of the ears to properly position the butt of the ears relative to the butting means by an endwise movement of the ears. In this last connection, I preferably employ a gravity feed, thereby doing away with complicated feeding mechanism heretofore employed for the same purpose.

It is still a further object of the invention to employ in combination with a common husking device, of a plurality of novel feeding and ear butting mechanisms, the said mechanisms leading to a common point of discharge adjacent the husking device, whereby the husking device, which as stated takes the form of a circular series or drum of husking rolls, has delivered thereto an increased supply of ears, the butts of which have been previously removed, to the end that a greater quantity of corn may be husked in a given time than heretofore.

Other and further improvements and novel details in the construction and arrangement of parts will be appreciated from the description to follow, which, for a clear understanding of the invention is to be considered in connection with the accompanying drawings forming a part hereof, and wherein is disclosed, for the purpose of illustration a convenient and satisfactory embodiment of the invention.

In the drawings: Figures 1, 2 and 3 are respectively a front elevation—plan view and an end view of my corn husking machine.

With more particular reference to the drawings, it will be observed that the same reference numerals refer to corresponding parts throughout the several views.

A suitable frame work is provided the same being conveniently of metal and generally indicated by the character A. The frame is of any preferred construction capable of supporting one or more, but preferably two sets of feeding and butting mechanisms coöperatively arranged whereby the butted ears will be delivered from the plurality of feeds to a common point of discharge so as to be delivered to the husking device. While as just stated, it is desirable to employ a pair of feeding and butting mechanisms, yet it is to be understood that it is within the contemplation of the invention, to use but one of such mechanisms if desired, and since the members of each pair are substantial duplicates one of the other, a description of one will suffice for the other. A suitable upright or standard 1 projects upwardly from a suitable base and terminates at its upper end to a rearwardly and upwardly inclined extension 2. Arranged to the rear of, and spaced from, the upright 1 is an upright or standard 3 terminating at its upper end at a point below the upper end of the upright 1 and connecting at this point with a rearwardly and upwardly inclined extension 4, the upper end of said extension being below the upper end of the extension 2, as clearly illustrated in Fig. 3. Suitable cross brace bars 5 project between the standards 1 and 3, while projecting from the sides of the standards 1 and 3 are elongated upwardly inclined supporting bars or rods 6. Additional brace bars 7 project between the upper end of the brace bars 6 and the upward extensions 2 and 4 of the standards. This frame work just described constitutes a supporting medium for the various parts of the feeding mechanism about to be described.

A rotatable shaft 8 has a suitable bearing at one end in the part 2 and at its opposite end in the part 4. Likewise a rotatable shaft 9 is mounted at opposite ends in suitable bearings in the ends of the bars 6 of the frame work. The said shafts carry suitable rollers 10 and 10$^a$ having sprockets 11. An endless carrier having at opposite edges suitable chains 12 to engage the sprocket 11 is mounted on the rollers, and because of the peculiar arrangement of the latter, the endless carrier will be arranged at an inclination from side to side. A suitable table or support 13 is arranged between opposite stretches of the endless carrier, the table being supported from the frame work at an incline similar to that of the rollers and constituting in the operation of the machine a rest for the conveyer and a support for the corn in its movement toward the butt removing device. Projecting between the chains 12 and extending outwardly are suitable conveyer blades 14 adapted to engage the ears of corn as delivered to the table 13 and move the same by a sidewise movement longitudinally of the table or toward the butting device. A rotatable saw 15 forms a convenient trimming or butting device, the saw being mounted on a shaft 16 supported in suitable bearings 16$^a$ on the frame work. The shaft 16 has a suitable gear connection 17 with the shaft 8 of the roller 10. The saw 15 is arranged so that its flat surface extends substantially parallel with and adjacent to the lower edge of the table 13, while its toothed periphery 15$^a$ which projects above the surface of the table will engage and sever the projecting stem or butt of the ear as the latter passes along the table and into contact with the edge of the cutter.

It being assumed that the ears are placed upon the table 13 in crosswise position, with the butt to be severed in innermost position, the ears, because of the inclination of the table, will fall by gravity by an endwise movement whereby to project the butt of the ear beyond the lower edge of the table. The downward movement of the ears is limited by a suitable hood 18 having a downwardly projecting lower edge 18$^a$ and adapted to coöperate with an upwardly projecting edge 19$^a$ of a plate 19 secured to the table. The said edges 18$^a$ and 19$^a$ are separated a sufficient distance and are suitably flared whereby to allow of the ready discharge of the butts therebetween, and at the same time these parts constitute abutments or limiting means for the body part of the ears. The main or body portion of the hood 18 forms with the table 13 means for maintaining the ears in position and for holding the same in their travel along the table. The hood is supported whereby it may be readily adjusted to accord with the size of the ears of the supply to be operated on. As shown, the hood may be supported by suitable bolts 20 passing through suitable supporting brackets 21 and threaded to the hood adjacent opposite edges thereof.

In order to more firmly hold the ears in position when operated upon by the ear butting means, I preferably provide a presser member adapted to coöperate with the table and conveying mechanism. To this end the hood 18 is conveniently cut away at 22, the cut away portion being adapted for the reception of a presser member preferably taking the form of an endless belt 23, which said belt is of a width to project over a substantial portion of the body of the ear of corn positioned on the table. The presser member is supported adjacent one end upon a roller 24 secured to the shaft 25 which latter has a suitable bearing at opposite ends in suitable upright brackets 26 supported from the brace bar 7. A roller 27 constitutes a support for the opposite end of the presser member the roller 27 being mounted upon a shaft 28 having bearings at opposite ends in the extensions 2 and 4 of the standards.

The various movable parts of the feed may be driven in any desired manner but preferably the shaft 8 constitutes the main drive shaft and has power imparted thereto from any suitable source. The shaft 8 has a suitable pulley 30, while the shaft 28 has a pulley 31, whereby movement is imparted to the shaft 28 from the shaft 8 through the medium of a belt 32.

The husking mechanism proper preferably takes the form of an annular drum, and the feeding mechanisms as above described are arranged one to each side of the cylinder as more particularly illustrated in Fig. 1. The upright bars 1 and 3 of the support for one feed mechanism are connected as by brace bars 32$^a$ to the parts 1 and 3 of the coöperating feed mechanism. The husking drum is given the numeral 34, the said drum having an annular series of rolls arranged in pairs, with the rolls of each pair rotating in opposite directions, and the inner ends of the feed mechanisms above described terminate at a point overlying one end of said drum 34, as clearly illustrated in Fig. 2. Suitably supported as by bracket bars 35, from the uprights 1 and 3, is a chute or inclined way 36 the lower end of which projects within the interior of the drum 34, and the sides of which 37 incline upwardly and outwardly, or into position to receive the ears as discharged from the inner ends of the tables 13. Since the specific construction of drum and husking rolls of themselves constitute no part of the present invention except in the general combination these parts will not be specifically described or illustrated.

The operation may be reviewed as follows: The parts having been set in operation, one or more operators take their places adjacent each of the feeding mechanisms at a point in front of the associated ear butting saws. The operators place the ears of corn to be husked upon the table, by inserting the butt end of the ears beneath the upper edge of the hood 18 which said upper edge of the hood is flared to facilitate the insertion of the end of the ear. Now because of the inclination of the table the ears will automatically position themselves by riding down the incline until the butts thereof assume a position between the edges of the table and the hood, the downward movement of the body of the ears being limited by abutting against the edges 18ª of the hood and 19ª of the plate 19 positioned upon the table. The butts of the ears are now in position to be engaged by the cutter when moved into contact with the latter, and sidewise movement of the ears along the table 13 or against the cutter 15ª is imparted by the blades 14 of the endless carrier. While operated upon by the cutting members 15 the ears are more firmly held in position by the presser member 23. After the butting of the ears the latter continue their movement along the table until reaching the end thereof, when they will be released by the hood and discharged by the conveyer blades on to the chute 36 and delivered directly into the interior of the drum whereby to be acted upon by the circular series of husking rolls at the periphery of the drum.

What I claim is:

1. In a husking machine, ear butting mechanism comprising an elongated table, a cutter arranged adjacent one edge of the table, means for feeding the ears from end to end of the table, and means whereby said ears are moved transversely relative to the table whereby to position the butts thereof in the path of the cutter, an upwardly extending abutment at the cutting edge of the table, and a guard plate overlying said ears, said guard plate extending substantially from side to side of the table and having a downwardly offset edge slightly spaced from and adapted to coöperate with said abutment so as to constitute an ear gaging means.

2. In a husking machine, the combination of means for feeding and butting the ears to be husked, comprising an elongated table arranged at a transverse incline whereby to feed the ears in a downward direction by gravity, means for limiting the downward movement of the ears, said means comprising a slotted abutment at the lower edge of the table, a cutter arranged to the outside of said abutment, and means for feeding the ears longitudinally of the table with the butt thereof projecting through the slot of the abutment.

3. In a husking machine, the combination of means for feeding and butting the ears to be husked, the said means comprising an elongated supporting member one edge of which is elevated above the other, an elongated abutment at the lower edge of the supporting member, said abutment having a slotted way for the protrusion of the butt of the ears, the said abutment having an overhanging guard to prevent tilting of the ears, and a cutter member arranged to the outside of said abutment and arranged to sever the projecting butts of the ears.

4. In a husking machine of the character described, the combination of an elongated table, one of the longitudinal edges thereof being elevated above the other whereby the table inclines from edge to edge, a conveyer movable longitudinally over the table, an abutment member arranged adjacent the lower edge of the table, ear butting means at the lower edge of the table, a hood overlying the table, said hood having an offset abutment part separated from and coöperating with the first mentioned abutment member, and an adjustable support for said hood.

5. In a husking machine, the combination of an elongated table arranged at a transverse inclination, a cutter arranged at the lower edge of the table, a longitudinally movable conveyer independent of the table arranged at a transverse inclination and movable over the table, a guard plate overlying the conveyer substantially from end to end thereof, and means for adjusting the guard plate vertically.

6. In a husking machine, the combination of an elongated table, a cutter arranged at one edge of the table, a longitudinally movable conveyer movable over the table, a guard plate overlying the conveyer, the said table and guard being arranged at a transverse incline, and said guard terminating at its lower edge in an ear gage flange separated from the table at its edge to permit the butts of the ears to project therebeyond, substantially as and for the purpose described.

7. In a husking machine, the combination of an elongated table, a cutter arranged at one edge of the table, a longitudinally movable conveyer movable over the table, a guard plate overlying the conveyer, said guard plate being cut away at a point opposite said cutter, and a presser member overlying said conveyer at said cutaway portion.

8. In a husking machine, ear butting means comprising an elongated transversely inclined table, transversely extending blades adapted to move over the table, side chains secured to opposite ends of the blades, sprocket wheels adjacent opposite ends of the table for said chains, ear butting means adapted to sever the butts of the ears as fed along the table, an upwardly projecting abutment at the lower edge of the table and a coöperating guard plate overlying the said blades and spaced vertically therefrom, said guard plate having an upwardly curved front edge and a downwardly curved rear edge.

9. In a husking machine, ear butting means comprising an elongated table, transversely extending blades adapted to move over the table, side chains for the blades, sprocket wheels adjacent opposite ends of the table for said chains, ear butting means adapted to sever the butts of the ears as fed along the table, and a guard plate overlying the said blades and extending substantially from side to side of the table and spaced vertically therefrom, the said guard plate and table having oppositely disposed flange parts separated from one another so as to form a butt receiving slot and gage at one edge of the table.

10. In a husking machine, ear butting means comprising an elongated table, transversely extending blades adapted to move over the table, side chains secured to opposite ends of the blades, sprocket wheels adjacent opposite ends of the table for said chains, ear butting means adapted to sever the butts of the ears as fed along the table, a guard plate overlying the said blades and spaced vertically therefrom, the said guard plate and table having oppositely disposed flange parts separated from one another so as to form a butt receiving slot at one edge of the table, the said table being arranged at a transverse incline whereby the butts of the ears will automatically seat in said slot, and means for independently adjusting opposite edges of the guard plate vertically.

11. In a machine of the character described, the combination of an elongated table arranged at a transverse inclination, sprocket wheels adjacent opposite ends of the table, chains mounted on the sprocket wheels and movable over the table, transverse flights connected at opposite ends to the chains, an elongated guard plate arranged above the table and extending at an incline and substantially from side to side of the table, said guard plate terminating at its lower edge in a downwardly curved gaging member, and an upwardly curved coöperating gage member projecting from the lower edge of the table and separated from the other gaging member by an intervening space, substantially as and for the purpose described.

In testimony whereof I affix my signature in presence of two witnesses.

FREDERICK H. KNAPP.

Witnesses:
 CALVIN T. MILANS,
 C. A. KRUG.

Copies of this patent may be obtained for five cents each, by addressing the "Commissioner of Patents, Washington, D. C."